United States Patent [19]

Vogel

[11] 4,277,101
[45] Jul. 7, 1981

[54] VEHICLE SEAT SUPPORT

[76] Inventor: Ignaz Vogel, Kleinsteinbacher Str. 44, Karlsruhe, Fed. Rep. of Germany, 7500

[21] Appl. No.: 112,834

[22] Filed: Jan. 17, 1980

[30] Foreign Application Priority Data

Jan. 23, 1979 [DE] Fed. Rep. of Germany ....... 2902389

[51] Int. Cl.³ ............................................. A47C 15/00
[52] U.S. Cl. .................................. 297/232; 297/248; 248/228
[58] Field of Search ............... 297/232, 248, 257, 440; 248/228, 225.3 R, 72

[56] References Cited

U.S. PATENT DOCUMENTS

| 2,485,090 | 10/1949 | Finch | 248/228 X |
| 2,990,458 | 6/1961 | Mageoch | 248/228 X |
| 3,412,966 | 11/1968 | Matson | 248/228 |
| 3,785,600 | 1/1974 | Padovano | 297/248 |
| 3,857,643 | 12/1974 | Bardocz | 248/228 |
| 3,979,149 | 9/1976 | Vogel | 297/232 |
| 3,990,741 | 11/1976 | Snyder et al. | 297/248 |

Primary Examiner—Francis K. Zugel
Attorney, Agent, or Firm—Klaus Bach

[57] ABSTRACT

A vehicle seat support includes a support tube mounted in the vehicle body for supporting the vehicle seats. The support tube is trapezoidal in cross-section and arranged with the wider of its parallel sides on top, facing the seats. The seats are mounted on support shackles having trapezoidal cut-outs corresponding to, and receiving, the tubular support member but being of somewhat greater height to provide some clearance. A thumbscrew is mounted in the seat structure above, and directed toward, the support tube for forcing the seat support shackle into firm engagement with the support tube.

5 Claims, 2 Drawing Figures

VEHICLE SEAT SUPPORT

BACKGROUND OF THE INVENTION

1. Field of the Invention:

The present invention relates to a vehicle seat support adapted to support at least one seat on a tubular frame structure mounted in a vehicle body.

2. Description of the Prior Art:

There are tubular seat support frames in which the support members consist of tubes of rectangular cross-section and the seats are mounted on clamps which are clamped onto the tubes. These arrangements have the advantage that the clamps carrying the seats can be mounted to the tubes in any position over the extent of the tubes such that the seat arrangement is variable depending on the availability of space in the passenger compartment. Such adaptability, however, is somewhat limited by the fact that for each seat two clamps are provided and that the tubular support member is supported on legs which are provided with similar clamps for interconnecting the tubular support member and the legs. It is noted that the clamps must have substantial strength so as to be capable of withstanding the seat load during operation of the vehicle but also of preventing rattling of the vehicle seats on the support frames when they are not used. This requires enormous clamping forces which are to be applied to the tubular support member at all times, also when a seat is not used. The clamps therefore are heavy and voluminous. Furthermore, the tubular member, which has to take up the clamping forces, that is the whole seat support is relatively heavy resulting in a relatively large deadweight of the vehicle.

It is accordingly desirable to provide a seat support structure which is relatively light but, nevertheless, has sufficient strength to withstand the loads occurring during vehicle operation and furthermore is unlikely to rattle even after extended use without load. Those properties should, of course, remain unchanged during the life of the structure.

SUMMARY OF THE INVENTION

The seat support comprises a tubular support member of trapezoidal cross-section so supported that the wider of the two parallel sides of the support tube is on top, that is faces the seat. The seat has support shackle members at its bottom, the shackle members having openings essentially corresponding to the cross-section of the support tube but of greater height such that spaces remain between the parallel sides of the tube and the adjacent shackle member sections. The seat is provided with a thumb-screw extending through the support shackle onto the support tube for clamping the support shackle to the support tube.

Engagement of the support shackle with the support tube is achieved by wedging action between the side walls of the tube and the shackle, not by clamping forces applied from the outside toward the center of the support tubes. With this arrangement the highest wedging force is applied when the seats are free of any load, that is when rattling is most likely to occur. When the seat is loaded the wedging forces of the support shackle with the support tube is likely to be decreased, at least not increased, but then the seat is also very unlikely to rattle. As a result, the highest wedging forces are applied when the seat is unloaded. Loading of the seat will not increase the wedging forces.

Wedging of the shackle with the tube could, of course, also be achieved when the trapezoidal tube would be so mounted that the wider of the two parallel tube surfaces would be on the bottom, that is when the narrower side would face the seat. Then, however, the load forces would be added to the clamping forces and this could generate pressure peaks which would make it necessary to use for the shackles as well as the support tube much stronger structure as compared with the arrangement of the present invention. Furthermore, the thumbscrew would have to be in the cross member at the bottom of the shackle which cross-member would then be subjected not only to tensile stresses but also to bending stresses and, consequently, would also have to be a strong, heavy structure. In addition, such an arrangement would reduce the leg room available under the seat. If arranged as proposed by the present invention, that is with the wider of the two parallel sides on top, the support tube can be firmly received in a trapezoidal cut-out of a support leg. No particular clamping between leg and support tube is necessary, only a simple mechanism needs to be provided for holding the support tube in engagement with the leg, the holding mechanism being simply an anchoring member adapted to pull the tube into the trapezoidal cut-out of the leg. An inverse position of the support tube would require uplift support of the support tube and would not permit securing thereof with the leg by light-weight anchoring means.

In order to secure wedging of the seat support shackle on the trapezoidal support tube but nevertheless insure that the support shackles are maintained at the same level on the support tube, the angle between the trapezoidal sides of the support tube is only a little smaller than the angle at which self-locking of the support shackle with the support tube occurs.

The use of a closed annular shackle member permits the use of relatively little material. The forces applied to the structure are generally in the direction in which the structural parts of the shackle member extend so that the seat support structure as a whole is relatively light. The shackle members may be formed simply by trapezoidal metal sheets which have trapezoidal cut-outs and whose parallel outside edges are interconnected by sheet metal. The support tube as well as the support shackle may be made of light metal alloys for further weight reduction.

As a result, a seat support structure is provided which, with little weight, is capable of securely withstanding the loads over the life of a vehicle seat.

It is also to be pointed out that it is possible to mount the vehicle seat on the support tube by means of a single support shackle structure thereby providing substantial freedom for the location of the seat on the support tube in axial direction thereof. The same is true for the location of the legs which do not need to be positioned in accordance with the width of the vehicle seat. They can be arranged where they can best be mounted.

DESCRIPTION OF THE PREFERRED EMBODIMENT

Figure 1:
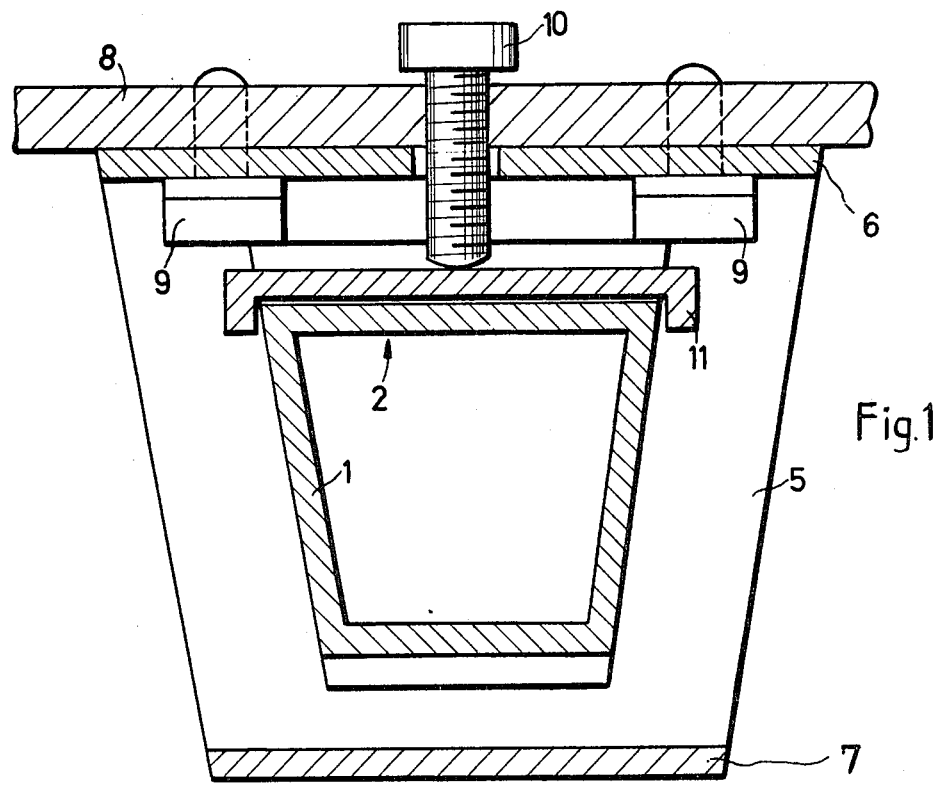
FIG. 1 shows in cross-section a support tube and a seat support shackle mounted thereon.

A support tube 1 of trapezoidal cross-section is, arranged with the wider one 2 of its parallel sides on top, supported by legs or support members 3, 4 on the floor and/or side walls of a vehicle body. A seat support shackle 5 consisting of trapezoidal sheet metal is mounted on the support tube 1 such that the support tube 1 extends through trapezoidal cut-outs in the sheet metal of the support shackle. The parallel outer edges of the trapezoidal metal sheets are interconnected by metal sheets. A seating member 8 is bolted onto the support shackle 5 by bolts 9. A thumbscrew 10 is associated with the seating member 8 such that it is directed toward the support tube 1. A reinforcement plate 11 is disposed between the support tube 1 and the thumbscrew 10. Upholstery 12 is provided on top of the seating member 8.

Figure 2:
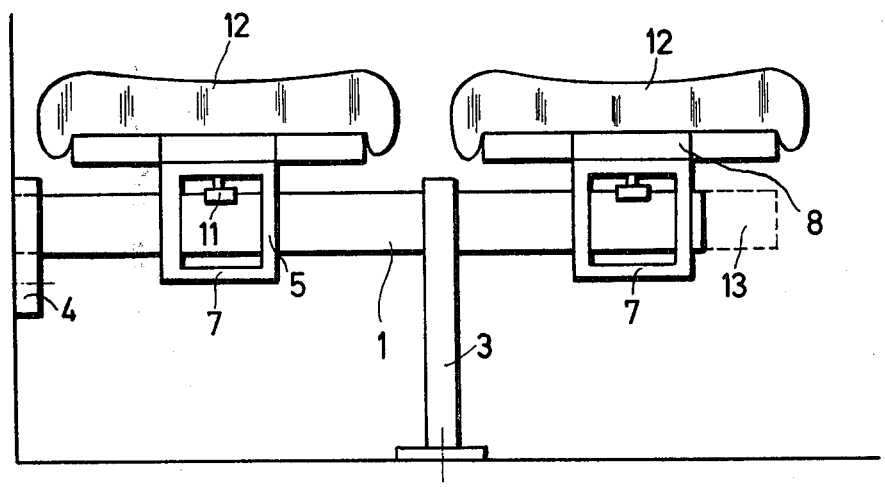
FIG. 2 is an elevational view of the seat support structure.

For mounting the seat support shackles 5 and the vehicle seats on the support tube 1 the seat support shackles 5 may first be mounted to the seating member 8. It is then possible to slide the shackles 5 with the seats on the trapezoidal support tube 1. As shown in FIG. 2 a leg 3 may be inserted between two seats. Also, a support member 4 may be mounted on one end of the support tube. After placement of the reinforcement plate 11 onto the support tube 1 the thumbscrew 10 may be tightened such that the inclined edge portions defining the trapezoidal openings in the shackle 5 are wedged into engagement with the corresponding surfaces of the support tube 1. Tests have shown that, in spite of the relatively light construction of the shackle 5 such engagement is strong enough that loosening or release of the shackle 5 will not occur; rather the shackle 5 and the seat mounted threon are always securely held in the selected position and without rattling. Nevertheless it is easily possible to release the shackle 5 simply by loosening the thumbscrew 10 so that the shackle 5 can be moved to a different position on the support tube 1. The support tube 1 is, for example, longer than necessary for the support of the seats as indicated in FIG. 2 at 13 by dashed lines than it is possible when desired to locate the seats at a greater distance from each other or from the side wall of the vehicle so as to offer a larger seating area and greater seating comfort to each passenger.

I claim:

1. A vehicle seat support comprising; a stiff support tube so supported in a vehicle body that it extends in the vehicle body below a row of seats so as to provide support for said seats, said support tube being trapezoidal in cross-section and so arranged that the wider of its two parallel sides is disposed on top facing the seats to be supported; a seat structure including a support shackle mounted on said support tube and having a seat mounted thereon, said seat support shackle having a trapezoidal opening corresponding, in cross-section, essentially to, and receiving, said support tube but being of greater height such that gaps remain between the parallel sides of the support tube and the adjacent support shackle sections; and a thumbscrew mounted in said seat structure above, and extending toward, said support tube for forcing said seat support shackle into firm engagement with said support tube.

2. A vehicle seat support as recited in claim 1, wherein said support tube and said support shackle consist of light metal alloys.

3. A vehicle seat as recited in claim 1, wherein said seat support shackle consists of two spaced trapezoidal metal sheets having trapezoidal cut-outs and transverse metal sheets extending between and joining the parallel edges of the spaced trapezoidal metal sheets.

4. A vehicle seat support as recited in claim 1, wherein the angle between the trapezoidal sides of the support tube and between the trapezoidal edges of the support shackle is only slightly in the range in which self-locking occurs between the support tube side faces and the support shackle.

5. A vehicle seat support as recited in claim 1, wherein support members are provided for supporting said support tube in said vehicle, said support members having openings corresponding in shape to, and receiving, said support tube, and wherein a locking mechanism is provided including an anchoring mechanism for holding the support tube in engagement with the support members.

* * * * *